(12) United States Patent
Chen et al.

(10) Patent No.: US 11,106,029 B2
(45) Date of Patent: Aug. 31, 2021

(54) ANNULAR-IRRADIATION HIGH-RESOLUTION QUANTITATIVE PHASE MICROIMAGING METHOD USING AN ANNULAR ILLUMINATION APERTURE

(71) Applicant: NANJING UNIVERSITY OF SCIENCE AND TECHNOLOGY, Jiangsu (CN)

(72) Inventors: Qian Chen, Nanjing (CN); Chao Zuo, Nanjing (CN); Jiasong Sun, Nanjing (CN); Shijie Feng, Nanjing (CN); Yuzhen Zhang, Nanjing (CN); Guohua Gu, Nanjing (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 16/496,548

(22) PCT Filed: Feb. 26, 2018

(86) PCT No.: PCT/CN2018/077214
§ 371 (c)(1),
(2) Date: Sep. 23, 2019

(87) PCT Pub. No.: WO2018/171383
PCT Pub. Date: Sep. 27, 2018

(65) Prior Publication Data
US 2021/0103135 A1  Apr. 8, 2021

(30) Foreign Application Priority Data
Mar. 24, 2017 (CN) .......................... 201710182694.9

(51) Int. Cl.
*H04N 7/18* (2006.01)
*G02B 21/36* (2006.01)
(Continued)

(52) U.S. Cl.
CPC .......... *G02B 21/367* (2013.01); *G02B 21/06* (2013.01); *G06T 5/10* (2013.01); *G06T 5/50* (2013.01);
(Continued)

(58) Field of Classification Search
CPC ........ G02B 21/367; G02B 21/06; G06T 5/10; G06T 5/50; G06T 2207/10148; G06T 2207/10056
(Continued)

(56) References Cited

U.S. PATENT DOCUMENTS 5,774,222 A * 6/1998 Maeda ............... G01N 21/9501
356/394
7,292,320 B2 * 11/2007 Takami ................... H01L 22/12
356/30
(Continued)

FOREIGN PATENT DOCUMENTS

| CN | 105158894 A | 12/2015 |
|---|---|---|
| CN | 105222901 A | 1/2016 |

(Continued)

OTHER PUBLICATIONS

Wang et al, Design and Test of a monolithic ultrasound image guided HIFU device using annular CMUT rings (Year: 2008).*
(Continued)

*Primary Examiner* — Shan E Elahi
(74) *Attorney, Agent, or Firm* — Birch, Stewart, Kolasch & Birch, LLP (57) ABSTRACT

An annular-irradiation high-resolution quantitative phase microimaging based on light intensity transfer equation is proposed here includes designing an annular aperture for the imaging system illumination; invoking the weak object approximation by using the parameters of annular illumination aperture and bright field microscopy to calculate a weak
(Continued)

object optical transfer function (WOTF) on the basis of a partially coherent imaging theory; and collecting three intensity images by a camera and obtaining the quantitative phase image of object by resolving the light intensity transfer equation with a deconvolution algorithm.

5 Claims, 4 Drawing Sheets

(51) Int. Cl.
*G02B 21/06* (2006.01)
*G06T 5/10* (2006.01)
*G06T 5/50* (2006.01)

(52) U.S. Cl.
CPC ............... *G06T 2207/10056* (2013.01); *G06T 2207/10148* (2013.01)

(58) Field of Classification Search
USPC .......................................................... 348/79
See application file for complete search history.

(56) References Cited

U.S. PATENT DOCUMENTS

| | | | |
|---|---|---|---|
| 7,787,588 B1 | 8/2010 | Yun et al. | |
| 2006/0052321 A1* | 3/2006 | Raitano | C07K 14/47 514/44 R |
| 2015/0279113 A1* | 10/2015 | Knorr | G06T 15/50 345/633 |
| 2015/0381958 A1* | 12/2015 | Zalevsky | G02B 27/46 250/354.1 |
| 2016/0125610 A1* | 5/2016 | Piestun | H04N 13/204 348/46 |
| 2016/0131891 A1* | 5/2016 | Higaki | G02B 21/367 348/79 |
| 2016/0216208 A1* | 7/2016 | Kim | H04N 5/2258 |
| 2017/0146788 A1* | 5/2017 | Waller | G06T 5/50 |
| 2017/0163971 A1* | 6/2017 | Wang | G01S 17/10 |
| 2017/0261429 A1* | 9/2017 | Pan | G01N 21/55 |
| 2020/0001513 A1* | 1/2020 | Jones | G01N 21/896 |

FOREIGN PATENT DOCUMENTS

| | | |
|---|---|---|
| CN | 105403508 A | 3/2016 |
| CN | 105675151 A | 6/2016 |
| CN | 106842540 A | 6/2017 |
| CN | 107290846 A | 10/2017 |
| WO | WO 2011/121523 A2 | 10/2011 |

OTHER PUBLICATIONS

International Search Report (PCT/ISA/210) issued in PCT/CN2018/077214, dated Aug. 21, 2018.

Kou et al., "Quantitative phase restoration by direct inversion using the optical transfer function" Optics Letters, ISSN:0146-9592, Jul. 15, 2011, vol. 14, No. 36, pp. 2671-2673.

* cited by examiner

ANNULAR-IRRADIATION HIGH-RESOLUTION QUANTITATIVE PHASE MICROIMAGING METHOD USING AN ANNULAR ILLUMINATION APERTURE

FIELD OF THE INVENTION

The invention belongs to optical measurement and imaging technique, in particular to annular-irradiation high-resolution quantitative phase method based on light intensity transfer equation.

BACKGROUND OF THE INVENTION

Phase recovery is an important technique for optical measurement and imaging. Phase imaging technique plays an important role in biomedical or industrial inspection. The most classical phase measurement method is interferometry in the near-half century of optical measurement techniques. However, the shortcomings of interferometry are also obvious: (1) interferometry generally requires a highly coherent light source (such as a laser), which requires a more complex interference device; (2) the introduction of an additional reference optical path leads to the demanding requirement for measurement environment; (3) the coherent speckle noise introduced by a high-coherence light source limits the spatial resolution and measurement accuracy of an imaging system.

Different from interferometry, the other class of very important phase measurement techniques do not require interference, which are collectively referred to as phase retrieval. Since it is very difficult to directly measure the phase distribution of optical wave fields and it is very easy to measure the amplitude/intensity of optical wave fields, the process of retrieving (estimating) a phase using intensity distribution can be regarded as a mathematical "inverse problem", that is, the phase retrieval problem. The methods of phase retrieval can also be subdivided into iterative method and direct method. Phase retrieval based on light intensity transfer equation is a typically direct phase retrieval method. Light intensity transfer equation is an elliptic partial differential equation of second order, which clarifies the quantitative relationship between the amount of change in light intensity along an optical axis and the phase of light waves on a plane perpendicular to an optical axis. In the case of known axial differential of light intensity and the distribution of light intensity at the focal plane, the phase information can be directly obtained by numerically resolving light intensity transfer equation. Compared with interferometry and iterative phase retrieval method, the main advantages of the direct method comprise: (1) non-interference, directly resolving phase information by measuring the surface light intensity, without introducing additional reference light; (2) non-iterative, obtaining a phase by directly resolving differential equation; (3) being well applied to white light illumination, such as Köhler illumination in traditional bright field microscopy; (4) direct acquisition of the absolute distribution of phase positions without phase unwrapping and no presence of $2\pi$ phase wrapping problem in general interferometry; (5) no need of complicated optical system, no harsh requirements for experimental environment and vibration being not sensitive.

The main problem in resolving light intensity transfer equation is to obtain the axial differential of the intensity image at a focal plane, which can be obtained by numerical finite difference of the light intensity. There is a trade-off problem of noise and resolution in how to choose appropriate defocus distance to obtain the axial differential of the light intensity. Studies have shown that when defocus distance is too small or too large, more cloudy low-frequency noise or high-frequency information loss occurs in an final reconstructed phase image. To solve this problem, many researchers have proposed multi-plane (>2) intensity measurement methods to estimate axial differentials. In addition, in order to more easily analyze the phase reconstruction method based on light intensity transfer equation, the researchers introduced phase contrast transfer function (CTF) analysis method (references [1]E. D. Barone-Nugent, A. Barty, KANugent, "Quantitative Phase-amplitude microscopy 1: optical microscopy," Journal of Microscopy 206, 194-203 (2002). [2] T. E. Gureyev, A. Pogany, D. M. Paganin, S. W. Wilkins, "Linear algorithms for phase retrieval in the Fresnel region," Optics Communications 231, 53-70 (2004). The above research shows that in the case of small defocus, as spatial frequency decreases, phase contrast function rapidly decreases to zero, which explains the high sensitivity of the phase reconstruction method based on light intensity transfer equation to low-frequency noise. In the case of large defocusing, the difference between transfer equation response of light intensity transfer equation in higher spatial frequency region and the CTF in coherent case becomes larger, which leads to serious loss of high-frequency information of a finally reconstructed phase and the fine features are fuzzy.

The background of light intensity transfer equation is described in more details below. Considering a monochromatic coherent paraxial optical wave field propagating along the z-axis whose complex amplitude U(x) is $U(x) = \sqrt{I(x)}\exp[jk\phi(x)]$ where j is the imaginary unit and $\phi(x)$ is the phase distribution to be retrieved, the light intensity transfer equation can be expressed as $$-k\frac{\partial I(x)}{\partial z} = \nabla \cdot [I(x)\nabla \phi(x)]$$

where $\nabla$ is the horizontal gradient operator, $\cdot$ is the dot multiplication operator, $\partial I(x)/\partial z$ is the axial differential of the light intensity, which can be obtained by numerical finite difference approximation. In general, the equation can be converted to the following Poisson equations by introducing the auxiliary function $\nabla \psi(x) = I(x)\nabla \phi(x)$.

$$-k\frac{\partial I(x)}{\partial z} = \nabla^2 \psi(x)$$

$$\nabla \psi(x) = I(x)\nabla \phi(x)$$

By resolving the first Poisson equation, the auxiliary function $\psi(x)$ can be obtained, and then the second Poisson equation can be resolved to obtain the quantitative phase of the measured object. For the observation of unstained cells and biological tissues, the light intensity varies little along the lateral direction, and the light intensity transfer equation can be simplified to a Poisson equation:

$$-k\frac{\partial I(x)}{\partial z} = I(x)\nabla^2 \phi(x)$$

So far, the resolution of the above two-step Poisson equations can be summarized as the inverse Laplacian operator in Fourier space ($1/\pi\lambda|u|^2$). This operator can be regarded as the response or transfer function of the light intensity transfer equation, and the inverse Laplacian is very poor in both low frequency and high frequency response, which affects the signal-to-noise ratio of the reconstructed phase and achievable maximum imaging resolution. Therefore, there are two main problems of low frequency noise and high frequency fuzziness. In order to solve this problem, many researchers have proposed multi-plane (>=2) intensity measurements to estimate axial differentials (References [3] M. Beleggia, MASchofield, VVVolkov. Y. Zhu, "On the transport of intensity technique For phase retrieval," Ultramicroscopy 102, 37-49 (2004). [4] C. Zuo, Q. Chen, Y. Yu, A. Asundi, "Transport-of-intensity phase imaging using Savitzky-Golay differentiation filter-theory and applications," Optic Express 21, 5346-5362 (2013). [5] C. Zuo, Q. Chen, L. Huang, A. Asundi, "Phase discrepancy analysis and compensation for fast Fourier transform based solution of the transport of intensity equation," Optics Express 22 (14), 17172-17186 (2014). These methods all achieve optimization of transfer function by selecting, combining or least square fitting some of the spatial frequencies in phase transfer function. However, as the measuring plane increases, this prolongs the time for data acquisition and processing, limiting the imaging speed of the system, ie the flux of the imaging system.

Furthermore, the limitation of the light intensity transfer equation is that only the phase of shooting intensity image is given rather than the phase of a real object as the parameters of the imaging system are not included in the equation. By extending the coherent CTF to the weak object optical transfer function (WOTF) under partial coherence, the application range of the light intensity transfer equation extends to the partially coherent domain. By introducing a weak object optical transfer function containing the parameters of imaging system, the light intensity transfer equation achieves phase retrieval of a real object in the case of partial coherence. Although partial coherent illumination is beneficial to improve the resolution of quantitative phase imaging, the phase reconstruction quality is mainly dependent on the form of WOTF. In conventional partial coherent imaging, the cutoff frequency of the WOTF can be increased by increasing the numerical aperture of a circular illumination light and achieve the purpose of improving imaging resolution. As shown in FIG. 2(a) to FIG. 2(d), when a conventional circular light illuminates, the cutoff frequency of the WOTF also becomes larger as the coherence coefficient s (s is the ratio of the numerical aperture of an illumination to the numerical aperture of an objective lens) becomes larger. However, when the numerical aperture of the illumination is close to the numerical aperture of the objective lens, the response of the WOTF at each spatial frequency is deteriorated, resulting in a gradual decrease in the contrast of the intensity image and accurate phase reconstruction cannot be achieved. Therefore, in the conventional method of using circular light source illumination, there is a conflict that cloudy low frequency noise and high-frequency fuzziness are difficult to be simultaneously considered and the accuracy of its phase reconstruction is poor.

SUMMARY OF THE INVENTION

The purpose of the present invention is to provide an annular-irradiation high-resolution quantitative phase method based on light intensity transfer equation, which can effectively resolve the conflict in addressing both cloudy low-frequency noise and high-frequency fuzziness and greatly increase spatial resolution in phase reconstruction while being more robust with respect to noise.

A technical solution for achieving the object of the present invention is: an annular irradiation high-resolution quantitative phase microimaging method based on light intensity transfer equation, First, an annular aperture is designed for the imaging system illumination. And then, by invoking the weak object approximation, the parameters of annular irradiation aperture and bright field microscopy are used to calculate a weak object optical transfer function (WOTF) on the basis of a partially coherent imaging theory. Finally, three intensity images are collected by a camera and the quantitative phase image of object is obtained by resolving the light intensity transfer equation with a deconvolution algorithm.

Compared with the prior arts, the invention has the significant advantages: (1) the imaging space cut-off frequency can be remarkably improved to twice the diffraction limit of a coherent imaging system, thereby improving the spatial resolution of phase reconstruction and the additional high-frequency part is beneficial to the retrieval of phase details. (2) The phase contrast can be improved by more than twice, so that the components of low-frequency and high-frequency are remarkably improved and the conflict between low-frequency noise and high-frequency fuzziness is solved while being more robust with respect to low-frequency noise. (3) A traditional bright field microscopy can get high-resolution quantitative phase imaging capability without complex transformation.

The invention is further described in detail below with reference to the accompanying drawings.

BRIEF DESCRIPTIONS OF THE DRAWINGS

(a) s=0.1; (b) s=0.4; (c) s=0.75; (d) s=0.99.

FIG. 3 (a) is a hologram of the micro lens array taken.

FIG. 3 (b) is a phase diagram obtained by digital holographic reconstruction.

FIG. 3 (d) is a phase cross-sectional contrast corresponding to the reticle regions in FIGS. 3 (b) and 3(c) respectively.

FIG. 4 (a) is the quantitative phase diagram reconstructed by the present invention; FIG. 4 (b) is the pseudo-color three-dimensional display of the thickness of the buccal epithelial cell sample. FIGS. 4 (c) to (e) are partial enlarged views of three selected regions in FIG. 4 (a). FIG. 4 (f) is the cross-sectional phase diagram indicated by an arrow in FIG. 4 (e).

FIG. 5 (a1) is the phase diagram which is retrieved after three light intensity images are collected in the optical axis direction with a defocusing distance of 0.5 µm under the annular light illumination with the coherence coefficient of 1; FIGS. 5 (b1) to (e1) are the phase diagrams which are retrieved after three light intensity images are collected in the optical axis direction with a defocusing distance of 0.5 μm under the annular light illumination with coherence coefficients of 0.22, 0.44, 0.78, and 0.99; FIGS. 5 (a2) to (e2) are respectively partial enlarged views of the corresponding regions in FIG. (a1); FIGS. 5 (a3) to (e3) are phase graphs of the cross sections indicated by the arrows in FIGS. 5 (a2) to (e2), respectively.

DESCRIPTION OF THE PREFERRED EMBODIMENT

Figure 1:
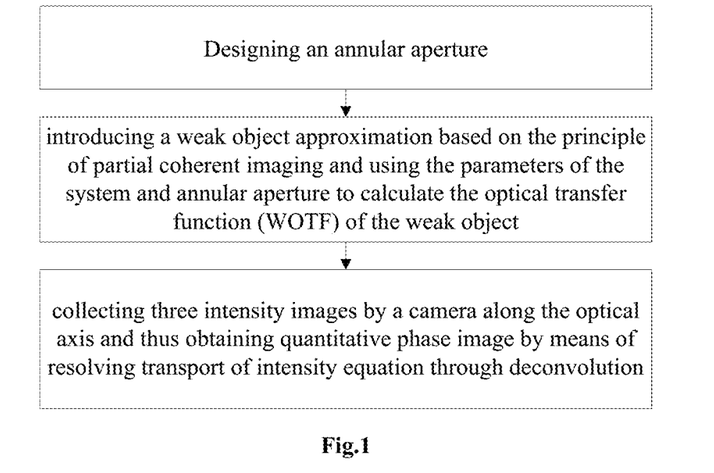
FIG. 1 is the schematic diagram showing the steps of a method for annular-irradiation high-resolution quantitative phase micro imaging based on a light intensity transfer equation of the present invention.
Figure 2:
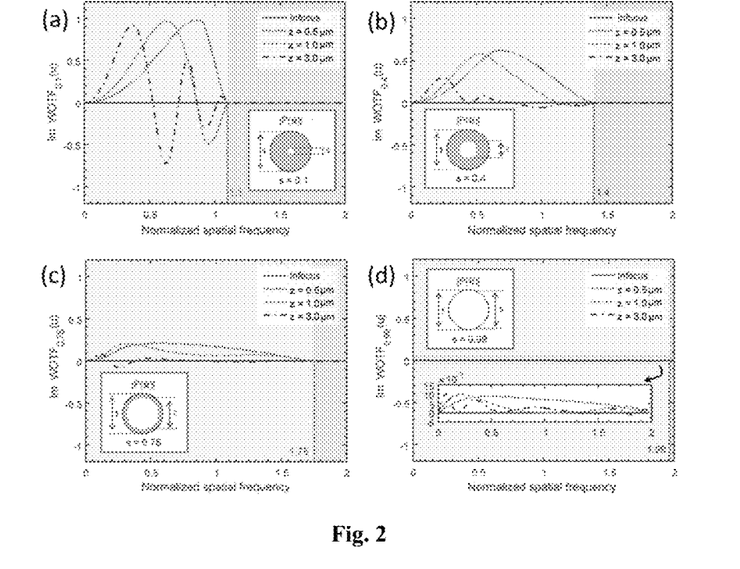
FIG. 2 is the response curve at different coherence coefficients and different defocus distances WOTF (imaginary part) in conventional circular illumination.

Referring to FIG. 1, the present invention is based on a method for annular-irradiation high-resolution quantitative phase micro-imaging based on a light intensity transfer equation, and the specific implementation steps are as follows:

Step one, an annular aperture is designed. This aperture is printed by a 3D printer or manufactured by a glass/metal material black anode electroplating or implemented by programmable LED (light emitting diode) or LCD (liquid crystal display) coding The designed annular aperture has two main parameters: The first one is the outer diameter r of the annular aperture, and the second one is the circular ring width Δs. The outer diameter r is equal to the pupil radius of the objective lens of bright field microscopy, while the parameter Δs usually set to (5-15%) of r. The annular region of the annular aperture is transparent while the center circular region is black opaque. The annular aperture is placed at the aperture stop of the condenser of the bright field microscopy by inserting the Bertrand lens in the barrel of the eyepiece observation cylinder of the bright field microscopy. The position of annular aperture is adjusted to be inscribed with pupil of the objective lens by observing the back focal plane of the objective lens through the eyepiece.

Step two, a weak object approximation based on the principle of partial coherent imaging (method) is invoked. The optical transfer function (WOTF) of a weak object is calculated through the parameters of the annular aperture and the bright field microscopy, namely, the formula of the optical transfer function of the weak object is as follows:

$$WOTF(u) = \iint s(u')|P(u')||P(u'+u)|e^{jk\Delta z\left(-\sqrt{1-\lambda^2|u'|^2}+\sqrt{1-\lambda^2|u+u'|^2}\right)}du' \quad (1)$$

wherein u and u' are two-dimensional coordinates of Fourier space, k is the wave number, λ is the illumination light wavelength of the bright field microscopy, S(u) is the light intensity distribution of the plane light source of the annular aperture; |P(u)| is the objective lens pupil function of the bright field microscopy, Δz is the defocus distance of the bright field microscopy along the optical axis, WOTF is the obtained optical transfer function of a weak object, and the imaginary part of the transfer function is the phase transfer function of the weak object; The mathematical expression of the designed annular aperture is:

$$S(\bar{u}) = \begin{cases} 1, & s_1 \le |\bar{u}| \le s_2 \\ 0, & |\bar{u}| < s_1, |\bar{u}| > s_2 \end{cases} \quad (2)$$

-continued
$$|P(\bar{u})| = \begin{cases} 1, & |\bar{u}| \le 1 \\ 0, & |\bar{u}| > 1 \end{cases} \quad (3)$$

where $\bar{u}$ is a frequency coordinate, which is normalized to the coherent diffraction limit ($NA_{obj}/\lambda$, $NA_{obj}$ is the numerical aperture of the objective lens, Δz is the wavelength of the illumination system), $s_1$ and $s_2$ are respectively the numerical aperture of the inner and outer rings of the annular aperture (according to the designed aperture $s_2$=1, $s_1$=90%), $S(\bar{u})$ represents the light intensity distribution of the annular flat lamp, $|P(\bar{u})|$ represents the objective pupil function of bright field microscopy; the illumination wavelength λ of bright field microscopy and the defocus distance Δz (here, different values can be selected for Δz, but the value should not be too large, generally less than 2 μm) are substituted into the optical transfer function formula (1) of the weak object so as to calculate the optical transfer function of the weak object of the annular stop at a specific defocus distance and illumination wavelength.

Step three, A camera is used to collect three intensity images along the optical axis and a quantitative phase image is obtained by means of resolving a light intensity transfer equation through deconvolution algorithm, the steps are as follows:

first, three light intensity images of under focus, focus, and over-focus are synchronously collected through a manually focused or electronically defocus controlled camera, respectively marked as $I_{\Delta z}(x)$, $I_0(x)$ and $I_{-\Delta z}(x)$, and their defocus distances are respectively Δz, 0, −Δz;

second, the Fourier transform is performed on three intensity images, which are respectively marked as $\tilde{I}_{\Delta z}(u)$, $\tilde{I}_0(u)$ and $\tilde{I}_{\Delta z}(u)$, $\tilde{I}_{\Delta z}(u)$, $\tilde{I}_0(u)$, $\tilde{I}_{-\Delta z}(u)$ and the calculated weak object optical transfer function WOTF in step 2 are substituted into equation (4), thereby the obtained Fourier transform $\tilde{\phi}(u)$ of the phase through deconvolution is:

$$\tilde{\phi}(u) = \frac{\tilde{I}_{\Delta z}(u) - \tilde{I}_{-\Delta z}(u)}{4\,\text{Im}[WOTF(u)]\tilde{I}_0(u)} \quad (4)$$

third, inverse Fourier transform is performed on $\tilde{\phi}(u)$ to obtain a quantitative phase $\phi(x)$, thereby realizing a high-resolution quantitative phase imaging.

From the above steps, it can be seen that by designing an annular aperture and obtaining the optical transfer function of the weak object determined by the annular aperture and the parameters of the bright field microscopy, the present invention can improve the response of each frequency of transfer function. Due to the increase of low frequency and high frequency components in the final reconstructed phase, the present method can effectively resolve the conflicts in addressing both cloudy low frequency noise and high frequency fuzziness in traditional circular illumination. At the same time, the use of annular-irradiation with high numerical aperture increases the cut-off frequency of the bright field microscopy, which can significantly improve the imaging resolution of bright field microscopy. In addition, there is no need to undertake the complicated modification of traditional bright field microscopy while endowing bright field microscopy with the capability of high-resolution quantitative phase micro-imaging.

Figure 3:
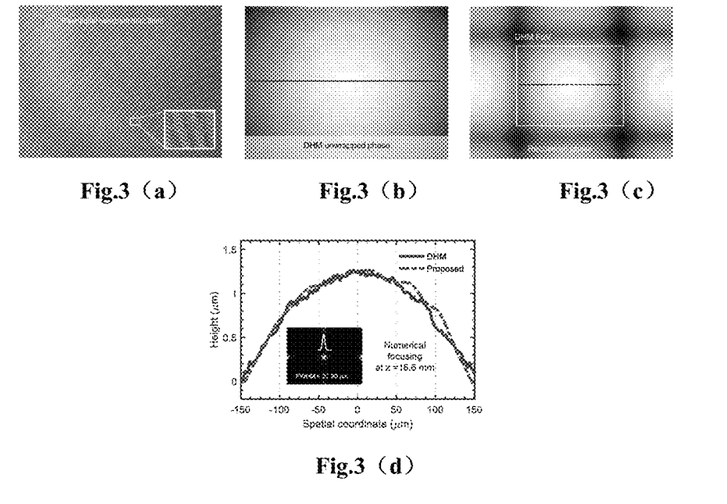

The experimental results of the present invention on micro-optical elements are given below. The sample is a pano-convex quartz microlens array (MLA300-7AR, Thorlabs) with a pitch of 300 μm. In the experiment, the light intensity axial differential signal is obtained by using the central finite difference between the over-focus and under-focus intensity distributions of two ±1 μm distance. FIG. 3(a) shows a hologram of the microlens array taken. FIG. 3(c) shows the quantitative phase reconstructed by the present invention. Note that although the phase range has exceeded 2π, the light intensity transfer equation can directly recover the absolute phase and does not require phase unwrapping. To verify the accuracy of the method of the invention, the results are compared with the results of digital holographic microscopy imaging (λ=632.8 nm, 60×, NA=0.85), as shown in FIG. 3(b). The present invention also selects a section curve from the two results for quantitative comparison, as shown in FIG. 3(d). The two curves fit very well, and the error may be due to the effects of noise and the inaccuracy of defining the best focal plane in digital holographic reconstruction.

Figure 4:
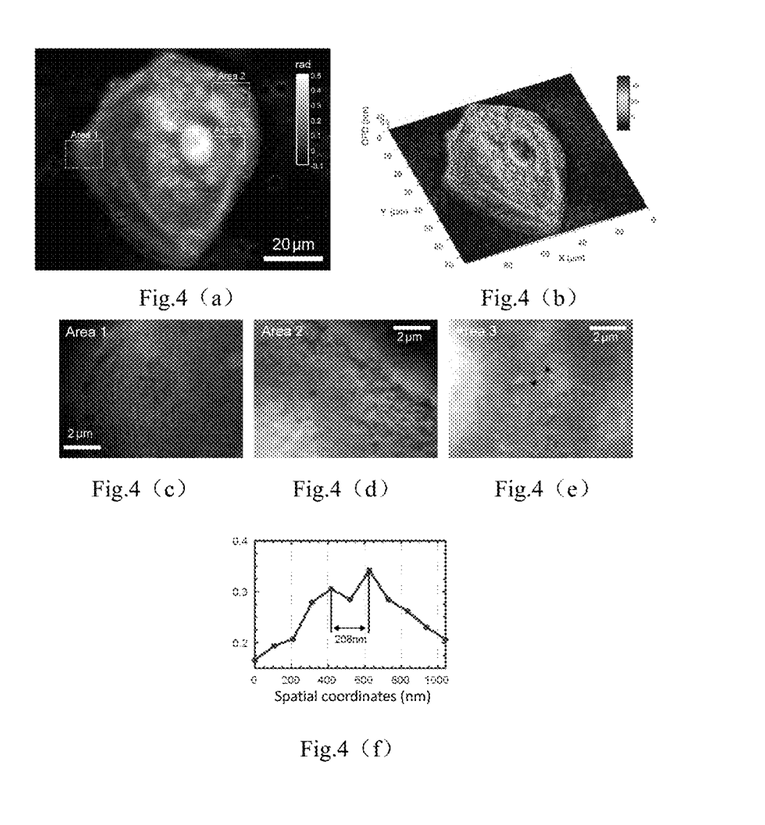
FIG. 4 is a graphical representation of experimental results of quantitative phase imaging of buccal epithelial cell samples.

The present invention performs quantitative phase imaging on a buccal epithelial cell sample using an oil immersion microscope objective (UPLSAPO 100×, Olympus) with a magnification of 100 times, a numerical aperture of 1.4, and a central wavelength of illumination light of 550 nm. As shown in FIG. 4, FIG. 4(a) is the quantitative phase diagram reconstructed by the present invention. FIG. 4 (b) is the pseudo-color three-dimensional display of the thickness of the buccal epithelial cell sample. FIGS. 4(c) to (e) are partial enlarged views of three selected regions in FIG. 4(a). FIG. 4(f) is the cross-sectional phase diagram indicated by an arrow in FIG. 4(e). As can be seen from FIG. 4(f), the minimum resolvable spherical structure spacing is 208 nm, (equivalent to an effective numerical aperture of 2.66), which means that the lateral resolution can be at least 208 nm in quantitative phase imaging. It can be seen from the experimental results that the phase recovered by the present invention is greatly improved in reconstruction resolution (the resolution ratio of the numerical aperture of twice objective lens is achieved).

Figure 5:
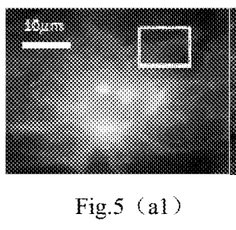
FIG. 5 is a schematic diagram showing the results of quantitative phase imaging of BMSC human bone marrow stromal cells samples.
Figure 6:
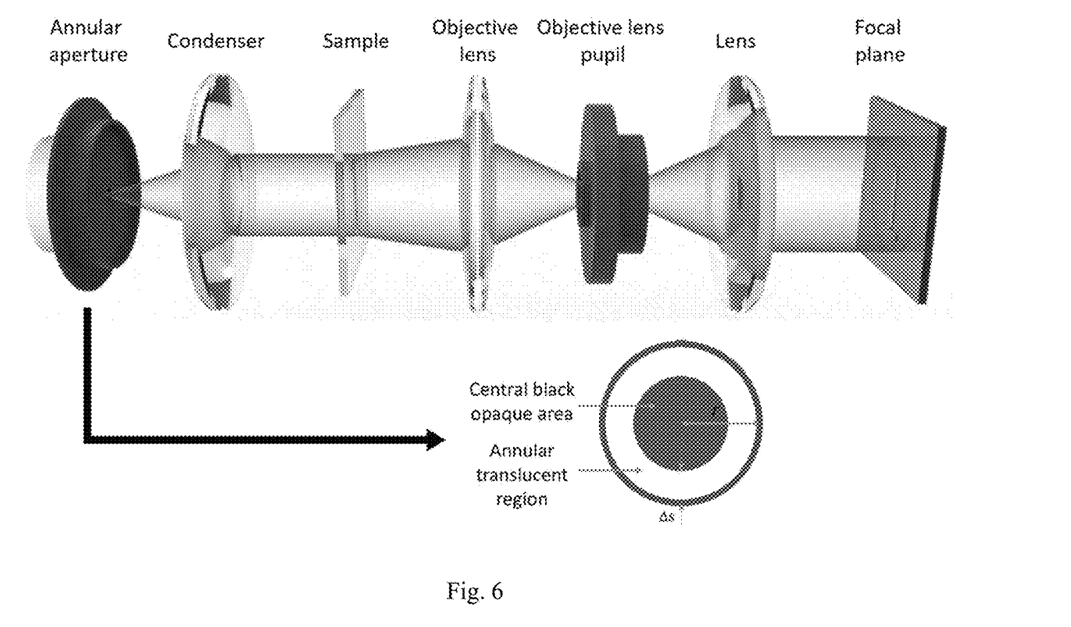
FIG. 6 is the schematic structural view of micro-imaging system according to one embodiment of the present invention.

In addition, the present invention also selects BMSC human bone marrow stromal cell samples for quantitative phase imaging, using a microscope objective (UPLSAPO 40×, Olympus) with a magnification of 40 times, a numerical aperture of 0.9, and a central wavelength of illumination light of 550 nm. As shown in FIG. 5, FIG. 5 (a1) is the retrieved phase diagram after three light intensity images are collected in the optical axis direction with a defocus distance of 0.5 μm under the annular light illumination with coherence coefficient of 1; FIG. 5 (b1) to (e1) are the phase diagrams retrieved after three light intensity images being collected in the optical axis direction with a defocus distance of 0.5 μm under the annular light illumination with coherence coefficient of 0.22, 0.44, 0.78, and 0.99; FIGS. 5 (a2) to (e2) are respectively the partial enlarged views of the corresponding regions in FIG. 5 (a1); FIGS. 5 (a3) to (e3) are respectively phase diagrams of the cross sections indicated by the arrows in FIGS. 5 (a2) to (e2). Comparing results of retrieved phase diagrams under the five different illumination modes, it can be seen that the retrieved phase using the annular light illumination is superior to the result of any of circular illuminations. The background of the reconstructed phase image of the present invention is more uniform, and the high frequency detail is retained to the greatest extent on the basis of removing low frequency noise. It is thus proved that the invention can effectively resolve the conflicts in addressing both cloudy low-frequency noise and high frequency fuzziness while being more robust of low-frequency noise.

The invention claimed is:

1. An annular-irradiation high-resolution quantitative phase microimaging method, comprising the steps of:
designing an annular illumination aperture for illuminating an imaging system, wherein the annular illumination aperture includes an annular region of transparent, and a center circular region of black opaque;
invoking a weak object optical transfer function (WOTF) approximation, wherein parameters of the annular illumination aperture and a bright field microscopy are used to calculate the WOTF on the basis of a partially coherent imaging theory; and
collecting three intensity images of under focus, focus, and over-focus by a camera and obtaining a quantitative phase image of object based on the three intensity images by resolving a light intensity transfer equation with a deconvolution algorithm.

2. The method according to claim 1, wherein the step of designing the annular illumination aperture comprises one of:
printing the annular illumination aperture by a 3D printer;
manufacturing the annular illumination aperture by a glass/metal material black anode electroplating; or
implementing the annular illumination aperture by programmable LED (light emitting diode) or LCD (liquid crystal display) coding.

3. The method according to claim 2, wherein the parameters of annular illumination aperture includes an outer diameter r and a circular ring width Δs, the outer diameter r is equal to a pupil radius of an objective lens of the bright field microscopy, and the circular ring width Δs is in a range of 5%-15% of the outer diameter r, and
wherein the annular illumination aperture is placed at an aperture stop of a condenser of the bright field microscopy by inserting Bertrand lens in a barrel of an eyepiece observation cylinder of the bright field microscopy, and a position of the annular illumination aperture is adjusted to be inscribed with pupil of the objective lens by observing a back focal plane of the objective lens through the eyepiece.

4. The method according to claim 1, wherein the WOTF is calculated according to a weak object optical transfer function formula defined as:

$$WOTF(u) = \iint s(u')|P(u')||P(u'+u)|e^{jk\Delta z\left(-\sqrt{1-\lambda^2|u'|^2}+\sqrt{1-\lambda^2|u+u'|^2}\right)}du',$$

where u and u' are two-dimensional coordinates of Fourier space, k is wave number, λ is an illumination light wavelength of the bright field microscopy, S(u) is a light intensity distribution of the flat lamp of the annular aperture, |P(u)| is a pupil function of the objective lens of the bright field microscopy, Δz is the defocus distance of the bright field microscopy along an optical axis, WOTF is the obtained optical transfer function of a weak object, the imaginary part of the transfer function is the phase transfer function of the weak object, and the designed annular aperture is:

$$S(\bar{u}) = \begin{cases} 1, & s_1 \leq |\bar{u}| \leq s_2 \\ 0, & |\bar{u}| < s_1, |\bar{u}| > s_2 \end{cases}, \text{ and}$$

$$|P(\bar{u})| = \begin{cases} 1, & |\bar{u}| \leq 1 \\ 0, & |\bar{u}| > 1 \end{cases},$$

where $\bar{u}$ is a frequency coordinate which is normalized to the coherent diffraction limit, ie, $NA_{obj}/\lambda$, $NA_{obj}$ represents a numerical aperture of the objective lens, $\lambda$ represents a wavelength of the illumination system; $s_1$ and $s_2$ represent respectively the numerical aperture of the inner and outer rings of the annular aperture, $S(\bar{u})$ represents an intensity distribution of a flat lamp of the annular illumination aperture, $|P(\bar{u})|$ represents the objective pupil function of the bright field microscopy, and wherein an illumination wavelength $\lambda$ of bright field microscopy and a defocus distance $\Delta z$ are substituted into the weak object optical transfer function formula, and the optical transfer function of the weak object of the annular aperture is calculated at a specific defocus distance and illumination wavelength.

5. The method according to claim 1, wherein the three intensity images are taken by the camera along an optical axis and the quantitative phase image is obtained by means of resolving the light intensity transfer equation through deconvolution algorithm, and the step of collecting three intensity images comprises the sub-steps of:

synchronously collecting three raw intensity images of under focus, focus, and over-focus through a manually focusing or electronically controlled defocus camera, respectively marked as $I_{\Delta z}(x)$, $I_0(x)$ and $I_{-\Delta z}(x)$, and defocus distances are respectively $\Delta z$, 0, $-\Delta z$;

performing a Fourier transform on the three intensity images, which are respectively marked as $\tilde{I}_{\Delta z}(u)$, $\tilde{I}_0(u)$ and $\tilde{I}_{\Delta z}(u)$, $\tilde{I}_{\Delta z}(u)$, $\tilde{I}_0(u)$, $\tilde{I}_{-\Delta z}(u)$ and the calculated weak object optical transfer function WOTF is substituted into the following equation, and Fourier transform $\tilde{\phi}(u)$ of the phase obtained through deconvolution is:

$$\tilde{\phi}(u) = \frac{\tilde{I}_{\Delta z}(u) - \tilde{I}_{-\Delta z}(u)}{4\,\text{Im}[WOTF(u)]\tilde{I}_0(u)};$$

and performing inverse Fourier transform on $\tilde{\phi}(u)$ and a quantitative phase $\phi(x)$, thereby realizing a high-resolution quantitative phase micro imaging.

\* \* \* \* \*